United States Patent [19]

Burdeska et al.

[11] 3,912,732

[45] Oct. 14, 1975

[54] DIOXAZINE DYESTUFFS

[75] Inventors: Kurt Burdeska, Basel; André Pugin, Riehen, both of Switzerland

[73] Assignee: Ciba-Geigy Corporation, Ardsley, N.Y.

[22] Filed: May 1, 1973

[21] Appl. No.: 356,232

[30] Foreign Application Priority Data

May 9, 1972 Switzerland ........................ 6872/72

[52] U.S. Cl.......... 260/246 R; 260/315; 260/396 R; 260/332.2 C; 260/465 E; 260/471 R; 260/558 D; 260/558 P; 260/559 S; 260/559 R; 260/571; 260/576; 8/1 B; 8/1 C; 8/54.2; 8/178 R; 8/178 E; 8/180; 8/177 R; 8/4; 8/5; 8/8; 8/179; 260/37 R; 260/37 SB; 260/37 NP; 260/37 P; 260/37 PC; 106/23

[51] Int. Cl.[2] ........................................ C09B 19/02

[58] Field of Search .................................... 260/246

[56] References Cited

UNITED STATES PATENTS

| | | | |
|---|---|---|---|
| 2,066,915 | 1/1937 | Thiess et al. | 260/246 |
| 2,086,871 | 7/1937 | Kranzlein et al. | 260/246 |
| 2,092,387 | 9/1937 | Brunner et al. | 260/246 |
| 2,278,260 | 3/1942 | Gruene et al. | 260/246 |
| 2,288,522 | 6/1942 | Gruene et al. | 260/246 |
| 2,355,497 | 8/1944 | Zwilgmeyer | 260/246 |
| 2,504,153 | 4/1950 | Robbins | 260/246 |
| 2,918,465 | 12/1959 | Lytle et al. | 260/246 |

*Primary Examiner*—Harry I. Moatz
*Attorney, Agent, or Firm*—Vincent J. Cavalieri; Nestor W. Shust

[57] ABSTRACT

Dioxazine dyestuffs of the formula

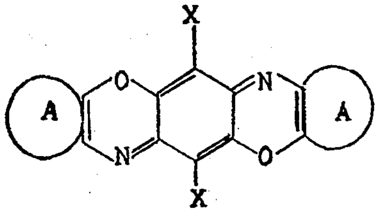

wherein the A denote aromatic radicals, especially benzene radicals, and the X denote alkoxy, aralkoxy, aryloxy, alkylmercapto, aralkylmercapto or arylmercapto groups, and, in the case that X denotes an alkoxy group, the radicals A must be free of sulphonamide groups are valuable pigments useful for coloring lacquers and plastics in violet shades of excellent fastness properties.

4 Claims, No Drawings

DIOXAZINE DYESTUFFS

It has been found that new valuable dioxazines of the formula

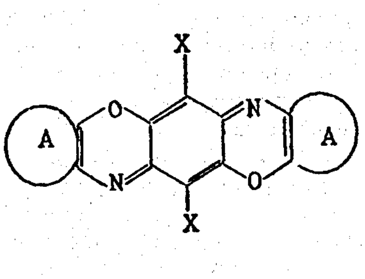

(I)

wherein the A denote aromatic radicals, especially benzene radicals, and the X denote alkoxy, aralkoxy, aryloxy, alkylmercapto, aralkylmercapto or arylmercapto groups, and, in the case that X denotes an alkoxy group, the radicals A must be free of sulphonamide groups, are obtained if a 2,5-diarylaminobenzoquinone of the formula

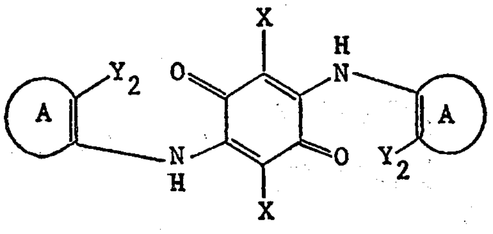

(II)

wherein $Y_2$ denotes a hydrogen atom or an alkoxy, aralkoxy, alkylmercapto, aryloxy, aralkylmercapto or arylmercapto group and X has the indicated meaning, are subjected to a cyclisation operation leading to dioxazines.

Dioxazines of particular interest are those of the formula

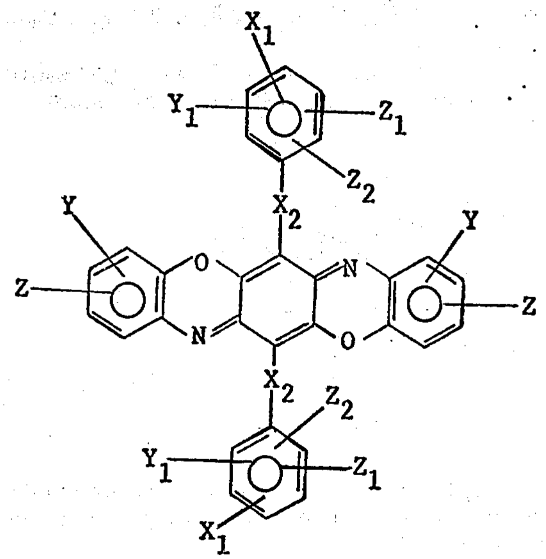

wherein Y and Z denote H or halogen atoms, nitro, nitrile or carbamoyl groups, lower alkyl, alkoxy, alkylmercapto, alkylsulphonyl, alkanoyl, alkanoylamino, alkoxycarbonyl, alkylcarbamoyl or alkylsulphamoyl groups, phenoxy groups which are optionally substituted by halogen atoms, lower alkyl, alkoxy, alkanoyl, phenyl or phenoxy groups, phenyl, benzoyl or benzoylamino groups which are optionally substituted by halogen atoms, or lower alkyl, alkoxy or alkoxycarbonyl groups, heterocyclic acylamino groups, or phenylcarbamoyl, phenylsulphamoyl or phenylamino groups which are optionally substituted by halogen atoms, trifluoromethyl groups or lower alkyl, alkoxy or alkoxycarbonyl groups, or wherein the radicals Y and Z form a fused carbocyclic or heterocyclic ring, $X_1$ denotes a H or halogen atom, an alkyl, alkoxy, alkanoyl or alkoxycarbonyl group, a trifluoromethyl group, a carboxylic acid amide group which is optionally substituted by lower alkyl or phenyl radicals, or a phenyl, phenoxy or benzoyl group which is optionally substituted by halogen atoms or lower alkyl or alkoxy groups, $Y_1$ and $Z_1$ denote H or halogen atoms or lower alkyl or alkoxy groups and $Z_2$ denotes an H or halogen atom, and $X_2$ denotes an O or S atom.

In the definitions given, and in the subsequent definitions, the term "lower" denotes that the substituents to which it relates possess 1 – 6 C atoms.

The 2,5-diarylaminobenzoquinones to be used as starting substances preferably correspond to the formula

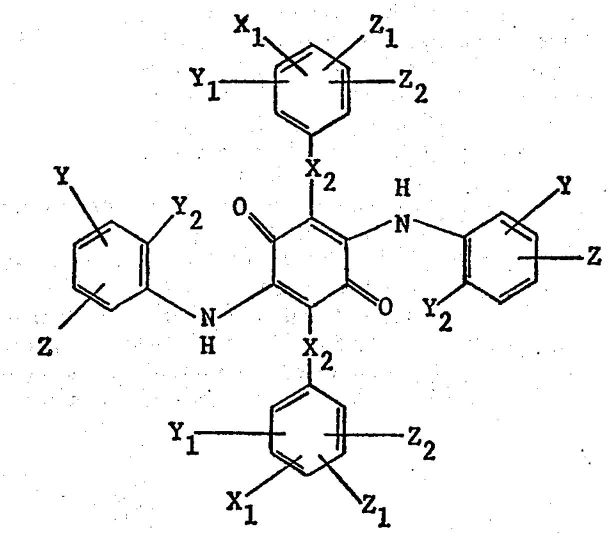

(IV)

wherein Y, Z, $X_1$, $X_2$, $Y_1$, $Y_2$, $Z_1$ and $Z_2$ have the indicated meaning.

The 2,5-diarylaminobenzoquinones are obtained by condensation of a benzoquinone of the formula

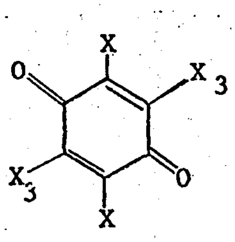

(V)

wherein the X have the indicated meaning and the $X_3$ denote aryloxy or arylmercapto groups, with an amine of the formula

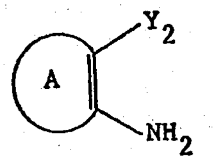

(VI)

wherein A and $Y_2$ have the indicated meaning, in the molar ratio of 1 : 2, preferably in the presence of a tertiary amine such as, for example, pyridine, quinoline, triethylamine, ethyldiisopropylamine or triethylenediamine.

The following benzoquinones may be mentioned as examples: 2,3,5,6-tetraphenoxybenzoquinone, 1,3,5,6-tetra-(2'-chlorophenoxy)-benzoquinone, 2,3,5,6-tetra-(3'-chlorophenoxy)-benzoquinone, 2,3,5,6-tetra-(4'-chlorophenoxy)-benzoquinone, 2,3,5,6-tetra-(2',4'-dichlorophenoxy)-benzoquinone, 2,3,5,6-tetra-(2',5'-dichlorophenoxy)-benzoquinone, 2,3,5,6-tetra-(3',4'-dichlorophenoxy)-benzoquinone, 2,3,5,6-tetra-(3',5'-dichlorophenoxy)-benzoquinone, 2,3,5,6-tetra-(2',4',5'-trichlorophenoxy)-benzoquinone, 2,3,5,6-tetra-(2',4',6'-trichlorophenoxy)-benzoquinone, 2,3,5,6-tetra-(2',3',4'-trichlorophenoxy)-benzoquinone, 2,3,5,6-tetra-(3',4',5'-trichlorophenoxy)-benzoquinone, 2,3,5,6-tetra-(4'-bromophenoxy)-benzoquinone, 2,3,5,6-tetra-(2',4'-dibromophenoxy)-benzoquinone, 2,3,5,6-tetra-(2'-methylphenoxy)-benzoquinone, 2,3,5,6-tetra-(3'-methylphenoxy)-benzoquinone, 2,3,5,6-tetra-(4'-methylphenoxy)-benzoquinone, 2,3,5,6-tetra-(2',4'-dimethylphenoxy)-benzoquinone, 2,3,5,6-tetra-(3',4'-dimethylphenoxy)-benzoquinone, 2,3,5,6-tetra-(3',5'-dimethylphenoxy)-benzoquinone, 2,3,5,6-tetra-(4'-tert.butyl-phenoxy)-benzoquinone, 2,3,5,6-tetra-(4'-sec. butyl-phenoxy)-benzoquinone, 2,3,5,6-tetra-(2'-sec.butyl-4'-tert.butyl-phenoxy)-benzoquinone, 2,3,5,6-tetra-(4'-α,α,β,β-tetramethyl-n-butyl-phenoxy)-benzoquinone, 2,3,5,6-tetra-(4'-chloro-3'-methylphenoxy)-benzoquinone, 2,3,5,6-tetra-(4'-chloro-3',5'-dimethyl-phenoxy)-benzoquinone, 2,3,5,6-tetra-(2'-methoxy-phenoxy)-benzoquinone, 2,3,5,6-tetra-(3'-methoxy-phenoxy)-benzoquinone, 2,3,5,6-tetra-(4'-methoxy-phenoxy)-benzoquinone, 2,3,5,6-tetra-(4'-ethoxy-phenoxy)-benzoquinone, 2,3,5,6-tetra-(4'-isopropoxy-phenoxy)-benzoquinone, 2,3,5,6-tetra-(4'-butoxy-phenoxy)-benzoquinone, 2,3,5,6-tetra-(4'-phenoxy-phenoxy)-benzoquinone, 2,3,5,6-tetra-4'-(4''-chlorophenoxy)-phenoxy-benzoquinone, 2,3,5,6-tetra-(2'-naphthoxy)-benzoquinone, 2,3,5,6-tetra-(5',6',7',8'-tetrahydronaphthoxy-2')-benzoquinone, 2,3,5,6-tetra-(2'-phenyl-phenoxy)-benzoquinone, 2,3,5,6-tetra-(4' -phenyl-phenoxy)-benzoquinone, 2,3,5,6-tetra-(4'-methylsulphonylphenoxy)-benzoquinone, 2,3,5,6-tetra-(4'-acetyl-phenoxy)-benzoquinone, 2,3,5,6-tetra-(4'-benzoyl-phenoxy)-benzoquinone, 2,3,5,6-tetra-(3'-trifluoromethyl-phenoxy)-benzoquinone, 2,3,5,6-tetra-(benzyloxy)-benzoquinone, 2,5-dimethoxy-3,6-diphenoxy-benzoquinone, 2,5-di-(methylmercapto)-3,6-phenoxy-benzoquinone, 2,3,5,6-tetra-(4'-chlorophenylmercapto)-benzoquinone, 2,3,5,6-tetra-(2',4'-chlorophenylmercapto)-benzoquinone, 2,3,5,6-tetra-(4'-methylphenylmercapto)-benzoquinone, 2,3,5,6-tetra-(2'-naphthylmercapto)-benzoquinone and 2,3,5,6-tetra-(benzylmercapto)-benzoquinone.

The benzoquinones mentioned can be obtained according to the process disclosed in U.S. copending application, Ser. No. 355,981, filed Apr. 30, 1973 by reaction of chloranil with phenols or thiophenols in a hydrophilic polar organic solvent.

The amines used are preferably those of the formula

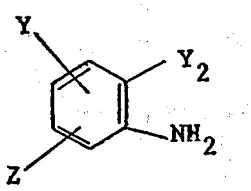

(VII)

wherin Y, $Y_2$ and Z have the indicated meaning.

Particular interest attaches to 3-aminocarbazoles of the formula

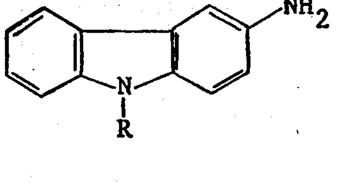

(VIII)

wherein R denotes an H atom or a lower alkyl radical.

The following amines may be mentioned as examples: 2-methoxyaniline, 2-ethoxyaniline, 2,4-dimethoxyaniline, 2,4-diethoxyaniline, 2,4-diphenoxyaniline, 2,5-di-α-naphthoxyaniline, 2,5-di-β-naphthoxy-aniline, 2,4-bis-(4'-methylphenoxy)-aniline, 2,4-bis-(2'-chlorophenoxy)-aniline, 2,4-bis- (4'-chlorophenoxy)-aniline, 2,4-bis-4'-chloro-1'-naphthoxy-aniline, 2,4-bis-(2',4'-dichlorophenoxy)-aniline, 2,4-bis-(2',4',5'-trichlorophenoxy)-aniline, 2,-4-bis-(2'-methoxyphenoxy)-aniline, 2,4-bis-(4'-ethoxyphenoxy)-aniline, 2,4-bis-(4'-phenoxyphenoxy)-aniline, 2,4-bis-(2'-phenylphenoxy)-aniline, 2,4-bis-(4'-phenylphenoxy)-aniline, 2,4,5-triphenoxyaniline, 2,4-diphenoxy-5-chloro-aniline, 2,4-di-α-naphthoxy-5-chloro-aniline, 2,4-di-β-naphthoxy-5-chloroaniline, 2,-4-bis-(2'-methylphenoxy)-5-chloroaniline, 2,4-bis-(4'-methylphenoxy)-5-chloroaniline, 2,4-bis-(3',4'-dimethylphenoxy)-5-chloroaniline, 2,4-bis-(2'-chlorophenoxy)-5-chloroaniline, 2,4-bis-(4'-chlorophenoxy)-5-chloroaniline, 2,4-bis-(2',5'-dichlorophenoxy)-5-chloroaniline, 2,4-bis-(2',4',5'-trichlorophenoxy)-5-chloroaniline, 2,4-bis-(4'-methoxyphenoxy)-5-chloroaniline, 2,4-bis-(4'-phenylphenoxy)-5-chloroaniline, 2,4-diphenoxy-3-chloroaniline, 2,4-di-α -naphthoxy-3-chloroaniline, 2,-4-di-β-naphthoxy-3-chloroaniline, 2,4-diphenoxy-3-bromoaniline, 2,4-di-α-naphthoxy-3-bromoaniline, 2,-4-di-β-naphthoxy-3-bromoaniline, 2,4-bis-(4'-chlorophenoxy)-3-chloroaniline, 2,4-bis-(4'-chloro-1'-naphthoxy)-3-chloroaniline, 2,4-bis-(2'-methylphenoxy)-3-chloroaniline, 2,4-bis-(2',4'-dimethylphenoxy)-3-chloroaniline, 2,4-bis-(4'-chlorophenoxy)-3-bromoaniline, 2,4-diphenoxy-5-methylaniline, 2-methoxy-5-phenylmercapto-aniline, 2-methoxy-5-(4'-chlorophenylmercapto)-aniline, 2-ethoxy-5-(2',5'-dichlorophenylmercapto)-aniline, 2,5-bis-phenylmercapto-aniline, 2,5-bis-(4'-chlorophenylmercapto)-aniline, 2-methoxy-4-nitro-aniline, 2,4-dimethoxy-3-cyano-aniline, 2-phenoxy-5-methylsulphonyl-aniline, 2-phenoxy-5-ethylsulphonylaniline, 2-phenoxy-5-acetyl-aniline, 2-phenoxy-5-benzoyl-aniline 2,4-diphenoxy-5-benzoyl-aniline, 2,4-diphenoxy-5-trifluoromethylaniline, 2,4-di-α-naphthoxy-5-trifluoromethylaniline, 2,4-bis-(4'-chlorophenoxy)-5-trifluoromethylaniline, 2,4-bis-(2'-chlorophenoxy)-5-trifluoromethylaniline, 2,4-di-α-naphthoxy-3-trifluoromethylaniline, 2,4-di-β-naphthoxy-3-trifluoromethylaniline, 2,4-diphenoxy-5-methoxycarbonyl, 2,4-diphenoxy-5-aminobenzoic acid ethyl ester, 2,4-bis-(2'-chlorophenoxy)-5-aminobenzoic acid methyl ester, 2,4-di-α-naphthoxy-5-aminobenzoic acid methyl ester, 2,4-di-β-naphthoxy-5-aminobenzoic acid methyl ester, 2,4-diphenoxy-5-aminobenzoic acid amide, 2,4-diphenoxy-5-aminobenzoic acid anilide, 2,4-di-α-naphthoxy-5-aminobenzoic acid anilide, 2,4-di-β-naphthoxy-5-aminobenzoic acid anilide, 2,4-diphenoxy-5-aminobenzoic acid 4' -chloranilide, 2,4-di-α-naphthoxy-5-aminobenzoic acid 4'-chloroanilide, 2,4-di-β-naphthoxy-5-aminobenzoic acid 4'-chloroanilide, 2,4-diphenoxy-5-aminobenzoic acid 2'-chloroanilide, 2,4-diphenoxy-5-aminobenzoic acid 2',4'-dichloroanilide, 2,4-diphenoxy-5-aminobenzoic acid 2',4',5'-trichloroanilide, 2,4-diphenoxy-5-aminobenzoic acid 2'-methoxyanilide, 2,4-diphenoxy-5-aminobenzoic acid 4'-methoxyanilide, 2,4-diphenoxy-5-aminobenzoic acid 2'-methylanilide, 2,4-diphenoxy-5-aminobenzoic acid 4'-methylanilide, 2,4-diphenoxy-5-aminobenzoic acid 3'-tri-fluoromethylanilide, 2,4-diphenoxy-5-aminobenzoic acid 4'-methoxycarbonylanilide, 2,4-bis-(4'-chlorophenoxy)-5-aminobenzoic acid anilide, 2,4-bis-(4'-chlorophenoxy)-5-aminobenzoic acid 2''-chloroanilide, 2,4-bis-(4'-chlorophenoxy)-5-aminobenzoic acid 4''-chloroanilide, 2,4-bis-(4'-chlorophenoxy)-5-aminobenzoic acid 2''-methylanilide, 2,4-bis-(4'-chlorophenoxy)-5-aminobenzoic acid 4''-methylanilide, 2,4-bis-(4'-chlorophenoxy)-5-aminobenzoic acid 2''-methoxyanilide, 2,4-bis-(4'-chlorophenoxy)-5-aminobenzoic acid 4''-methoxyanilide, 2,4-bis-(2'-chlorophenoxy)-5-aminobenzoic acid anilide, 2,4-bis-(2'-chlorophenoxy)-5-aminobenzoic acid 4''-chloranilide, 2,4-bis-(2'-chlorophenoxy)-5-aminobenzoic acid 4''-methylanilide, 2,4-bis-(2'-chlorophenoxy)-5-aminobenzoic acid 2'',4'',5''-trichloroanilide, 2,4-bis-(4'-methylphenoxy)-5-aminobenzoic acid anilide, 2,4-bis-(4'-methylphenoxy)- 5-aminobenzoic acid 4''-chloroanilide, 2,4-bis-(4'-methylphenoxy)-5-aminobenzoic acid 3''-methylanilide, 2,4-bis-(4'-methylphenoxy)-5-aminobenzoic acid 4''-methylanilide, 2,4-bis-(4'-methylphenoxy)-5-aminobenzoic acid methyl ester, 2,4-bis-(2'-phenylphenoxy)-5-aminobenzoic acid ethyl ester, 2,4-bis-(2'-phenylphenoxy)-5-aminobenzoic acid anilide, 2,4-bis-(2'-phenylphenoxy)-5-aminobenzoic acid 4''-chloroanilide, 2,4-bis-(2'-phenylphenoxy)-5-aminobenzoic acid 4''-methylanilide, 2,4-bis-(2'-phenylphenoxy)-5-aminobenzoic acid 4''-methoxyanilide, 2,4-bis-(4'-phenylphenoxy)-5-aminobenzoic acid anilide, 2,4-bis-(4'-phenylphenoxy)-5-aminobenzoic acid 4''-chloroanilide, 4-phenoxy-3-aminobenzoic-sulphonic acid dimethylamide, 4-phenoxy-3-aminobenzoic-sulphonic acid phenylamide, 2,5-diethoxy-4-(4'-chlorobenzoylamino)-aniline, 2,5-diethoxy-4-(2'-chlorobenzoylamino)-aniline, 2,5-diethoxy-4-(2',4'-dichlorobenzoylamino)-aniline, 2,5-diethoxy-4-(2'-methylbenzoylamino)-aniline, 2,5-diethoxy-4-(3',4'-dimethylbenzoylamino)-aniline, 2,5-diethoxy-4-(2'-methoxybenzoylamino)-aniline, 2,5-diethoxy-4-(4'-phenylbenzoylamino)-aniline, 2,5-diethoxy-4-(α-naphthoylamino)-aniline, 2,5-diethoxy-4-(2'-thienoylamino)-aniline, 2,5-dimethoxy-4-(propionylamino)-aniline, 2,5-dimethoxy-4-(benzoylamino)-aniline, 4-aminodiphenyl, 4-amino-4'-chloro-diphenyl, 4-amino-4'-methoxycarbonyldiphenyl, 2-amino-3-methoxy-diphenylene oxide, 3-aminofluorene, 3-amino-carbazole, 3-amino-N-methyl-carbazole, 3-amino-N-ethyl-carbazole, 3-amino-N-benzyl-carbazole, 2-aminonaphthalene, 3-aminopyrene and 2-aminochrysene.

The dioxazine cyclisation is appropriately carried out by heating the 2,5-diarylaminobenzoquinone to temperatures of 150° to 210°C in an inert organic solvent, such as o-dichlorobenzene, trichlorobenzene, nitrobenzene, naphthalene or chloronaphthalene, optionally in the presence of an acid halide, such as, for example, benzoyl chloride, p-toluenesulphonic acid chloride or thionyl chloride. In certain cases it proves desirable to dispense with isolating the 2,5-diarylaminobenzoquinones and to follow the condensation of the benzoquinones of the formula V with the arylamine directly by the dioxazine cyclisation.

The dioxazines obtained are valuable red to blue dyestuffs which are above all suitable for use as pigments. In a finely divided form they can be used for pigmenting high molecular organic material, for example cellulose ethers and cellulose esters, such as ethylcellulose, nitrocellulose, cellulose acetate, cellulose butyrate, high molecular polyamides and high molecular polyurethanes or polyesters, natural resins or synthetic resins, such as polymerisation resins or condensation resins, for example aminoplasts, especially urea-formaldehyde and melamineformaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

Herein, it does not matter whether the high molecular compounds mentioned are in the form of plastic masses or melts or in the form of spinning solutions, lacquers, paints or printing inks. Depending on the end use, it proves advantageous to employ the new pigments as toners or in the form of preparations.

In certain cases solutions of the dioxazines according to the invention in polymers are also obtained.

The new dyestuffs are also suitable for use as photoelectric toners, especially in photoelectrophoresis.

In the examples which follow the parts, unless otherwise stated, denote parts by weight and the percentages denote percentages by weight.

EXAMPLE 1

31.2 g of 2,3,5,6-tetra-[2',4',5'-trichlorophenoxy]-1,4-benzoquinone and 14.7 g of 3-amino-N-ethyl-carbazole in a mixture of 140 ml of ethanol and 60 ml of ethylene glycol monoethyl ether are heated to 70°C. After adding 5.5 g of triethylamine, the mixture is heated to the boil for 8 hours, whilst stirring. The product which has precipitated is filtered off at 60°C, washed with alcohol and dried in vacuo at 100°C. 26.5 g of red-brown crystals are obtained.

25.6 g of the dianil, 200 ml of 1,2-dichlorobenzene and 3.7 ml of benzene sulphochloride are heated to 175°–180°C and stirred for 5 hours at this temperature. After cooling to 120°C the dyestuff which has precipitated, of the formula

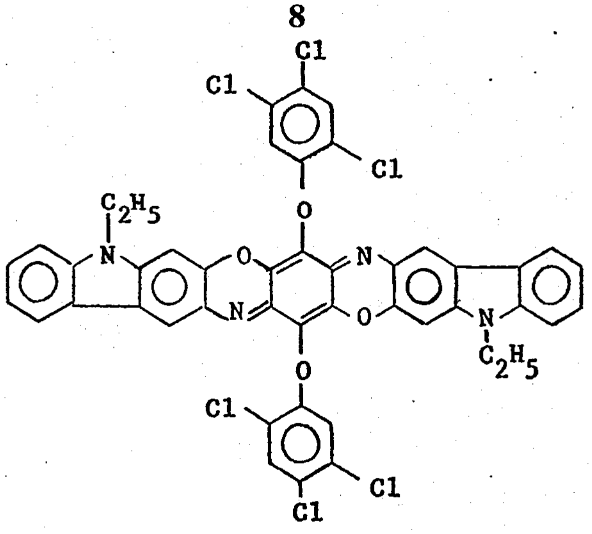

is filtered off, washed with 1,2-dichlorobenzene which has been heated to 120°C, then with alcohol and dried in vacuo at 100°C. The yield is 22.5 g of green crystals having a metallic sheen.

15 g of this crude product are ground for 3 hours with 70 g of anhydrous calcium chloride in a vibratory mill containing 3,600 kg of iron balls each of 15 mm diameter. The ground material is then extracted with dilute hydrochloric acid and the residue is filtered off, washed with water and dried in vacuo at 60°C. A pure reddish-tinged blue strongly coloured pigment is obtained, which has very good fastness to overlacquering, migration and light.

EXAMPLES 2 – 23

The table which follows lists further dioxazine dyestuffs which are obtained if, following the instructions of Example 1, the diarylaminobenzoquinones of the formula given below, wherein $R_1$ and $R_2$ have the meaning indicated in column II, are cyclised.

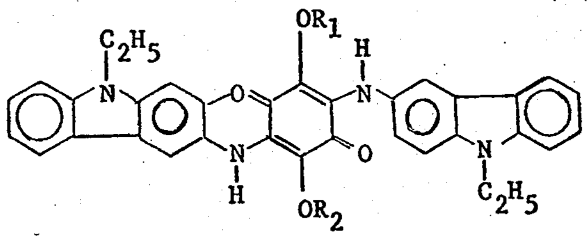

Table 1

| Example No. | $R_1 = R_2$ | Shade in PVC sheets 0.2% of pigment + 1% of $TiO_2$ |
|---|---|---|
| 2 | 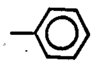 | Violet |
| 3 | 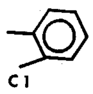 | Reddish-tinged blue |
| 4 | 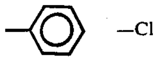 | Reddish-tinged blue |
| 5 | 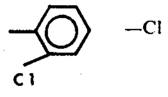 | Blue |

Table 1-Continued
| Example No. | $R_1 = R_2$ | Shade in PVC sheets 0.2% of pigment + 1% of $TiO_2$ |
|---|---|---|
| 6 | 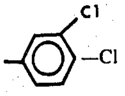 | Reddish-tinged blue |
| 7 | 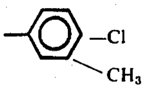 | Reddish-tinged blue |
| 8 | 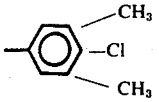 | Red-violet |
| 10 | 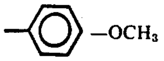 | Red-violet |
| 11 | 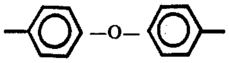 | Violet |
| 12 | 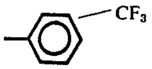 | Reddish-tinged blue |
| 13 | 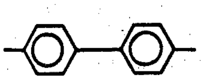 | Violet |
| 14 | 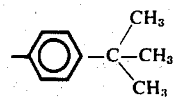 | Reddish-tinged blue |
| 15 | 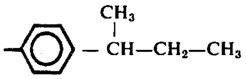 | Violet |
| 16 | 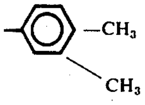 | Violet |
| 17 | 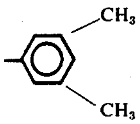 | Violet |
| 18 | 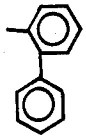 | Blue |
| 19 | 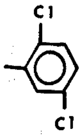 | Reddish-tinged blue |
| 20 | 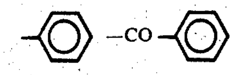 | Reddish-tinged blue |
| 21 | 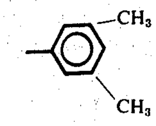 | Violet |

Table 1-Continued

| Example No. | $R_1 = R_2$ | Shade in PVC sheets 0.2% of pigment + 1% of $TiO_2$ |
|---|---|---|
| 22 | 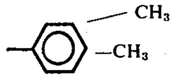 | Violet |
| 23 | 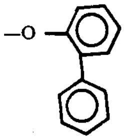 | Blue |
| 24 | 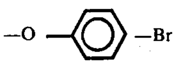 | Violet |
| 25 | 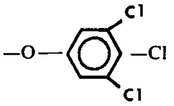 | Violet |
| 26 | 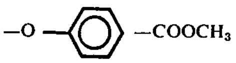 | Violet |

EXAMPLE 27

21.34 g of 2,5-di-(3',5'-dichlorophenoxy)-3,6-bis-(2',5'-dimethoxy-4'-benzoylamino-phenylamino)-1,4-benzoquinone, 90 ml of 1,2,4-trichlorobenzene and 5.4 ml of benzoyl chloride are heated to 190°–195°C for 4 hours. After cooling to 80°C, the dyestuff which as precipitated, of the formula

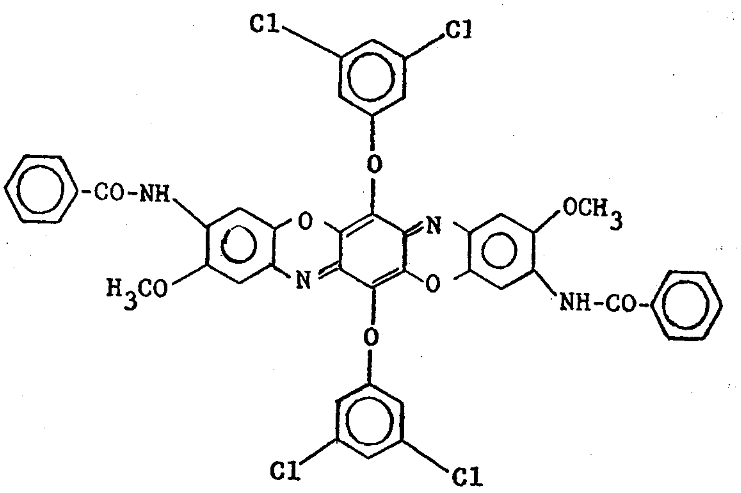

is filtered off, washed with 1,2,4-trichlorobenzene and then with alcohol, and dried in vacuo at 100°C. The yield is 18 g of green crystals having a metallic sheen.

To bring it to a finely divided form the product is ground with anhydrous calcium chloride as described in Example 1. After removing the salt and the solvent, a strongly coloured bluish-tinged violet pigment is obtained which has very good fastness to light, heat and migration.

The 2,5-di-(3',5'-dichlorophenoxy)-3,6-bis-(2',5'-dimethoxy-4'-benzoylamino-phenylamino)-1,4-benzoquinone required for the synthesis was manufactured as follows.

26.32 g of 2,3,5,6-tetra-(3',5'-dichlorophenoxy)-1,4-benzoquinone are heated to 70°C with 19.1 g of 2,5-dimethoxy-4-benzoylamino-aniline and a mixture of 150 ml of alcohol and 50 ml of ethylene glycol monoethyl ether. After adding 3.5 g of triethylamine, the mixture is heated on a boiling water bath for 24 hours. After cooling to 60°C, the produce which has precipitated is filtered off, washed with alcohol and dried in vacuo. The yield is 25 g of brown-violet product.

EXAMPLES 28 – 38

If instead of 19.1 g of 2,5-dimethoxy-4-benzoylaminoaniline equimolar amounts of one of the amines listed in Table II, column 2, are used and otherwise the same procedure is followed, violet pigments with similarly good properties are again obtained. The shade of 0.2% strength colourations in polyvinyl chloride sheets is indicated in column 3 of this table.

Table II

| Example No. | Amine | Shade in PVC sheets, 0.2% of pigment + 1% of $TiO_2$ |
|---|---|---|
| 28 | 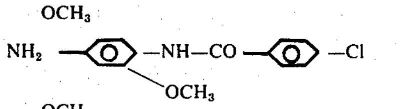 | Violet |
| 29 | 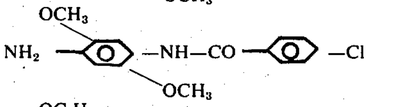 | Violet |
| 30 | 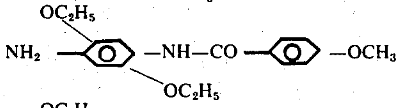 | Red-violet |
| 31 | 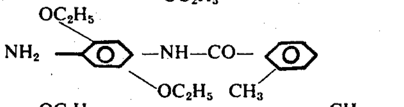 | Violet |
| 32 | 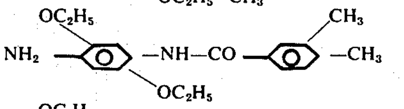 | Violet |
| 33 | 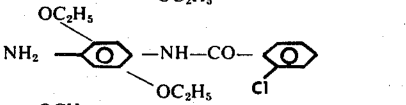 | Violet |
| 34 | 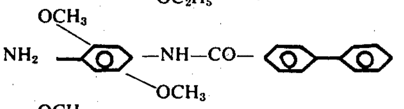 | Red-violet |
| 35 | 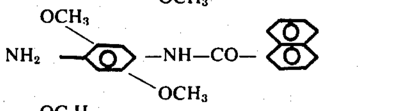 | Red violet |
| 36 | 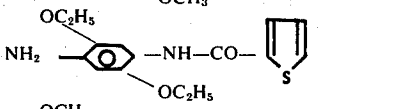 | Violet |
| 37 | 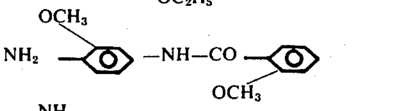 | Claret |
| 38 | 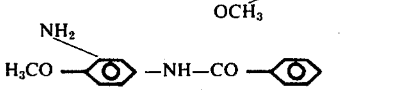 | Blue-red |

EXAMPLE 39

18 g of 2,5-di-(3'4'-dichlorophenoxy)-3,6-bis-(2'-methoxy-5'-chloro-4'-acetyl-amino-phenylamino)-1,4-benzoquinone, 100 ml of 1,2,4-trichlorobenzene and 10.5 ml of benzoyl chloride are heated to 190°–195°C and stirred for 6 hours at this temperature. The pigment, of the formula

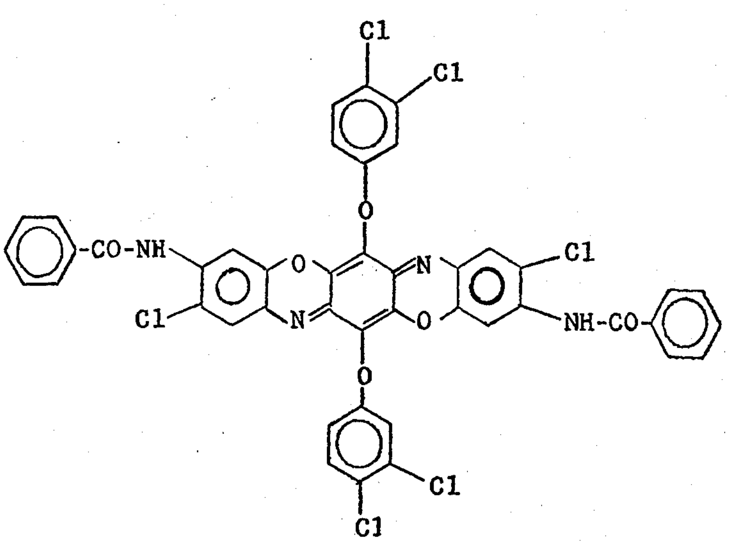

which has already precipitated whilst the mixture is hot is filtered off at 100°C, washed with 1,2,4-trichlorobenzene, heated to 100°C and then with alcohol, and dried in vacuo at 100°C. Yield: 14 g of red-brown crystals.

After bringing the product to a finely divided form by grinding with anhydrous calcium chloride, a strongly coloured claret pigment is obtained which has very good fastness to light, weathering and migration.

The 2,5-di-(3',4'-dichlorophenoxy)-3,6-bis-(2'-methoxy-5'-chloro-4'-acetyl-amino-phenylamino)-1,4-benzoquinone required for the manufacture of the pigment was manufactured by reaction of 2,3,5,6-tetra-(3',4'-dichlorophenoxy)-1,4-benzoquinone with 2-methoxy-5-chloro-4-acetyl-amino-aniline in a mixture of ethanol and ethylene glycol monoethyl ether, in the presence of triethylamine.

EXAMPLE 40

30.1 g of 2,3,5,6-tetra-(3',4'-dichlorophenoxy)-1,4-benzoquinone, 18 g of 2,5-dimethoxy-4-propionylamino-aniline and 5.2 g of quinoline are heated with 200 ml of 1,2,4-trichlorobenzene to 200°–205°C and stirred at this temperature for 17 hours. After cooling to 110°C, the pigment which has precipitated, of the formula

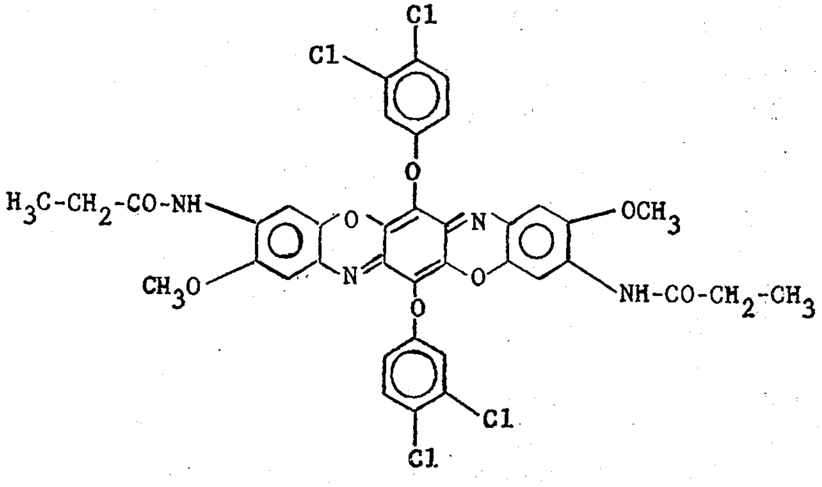

is filtered off and washed with trichlorobenzene heated to 110°C and then with alcohol and acetone. After drying at 120°C in vacuo, 19 g of violet-tinged green crystals are obtained.

After bringing the product to a finely divided form by grinding with anhydrous calcium chloride, a violet, strongly coloured pigment is obtained which has very good fastness to light, overlacquering and migration.

EXAMPLE 41

If, in the synthesis, 24 g of 2,5-diethoxy-4-benzoylamino-aniline are used instead of 18 g of 2,5-dimethoxy-4-propionylamino-aniline and otherwise the same procedure is followed, a violet pigment with similarly good properties is again obtained.

EXAMPLE 42

23.2 g of 2,5-di-(4'-chlorophenoxy)-3,6-bis-[2'-methoxy-4-(4''-chlorophenoxy)-phenylamino]-1,4-benzoquinone, 6.6 ml of benzoyl chloride and 100 ml of 1,2,4-trichlorobenzene are heated to 190°–195°C and stirred at this temperature for 4 hours. After cooling to 80°C, the pigment which has precipitated, of the formula

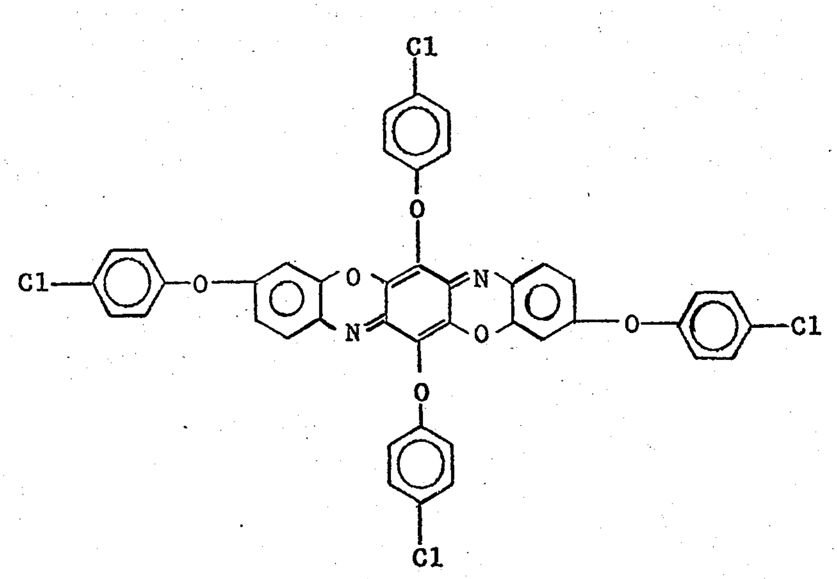

is filtered off, washed with 1,2,4-trichlorobenzene heated to 80°C and then with alcohol, and dried in vacuo at 100°C. 15.5 g of violet crystals with a metallic sheen are obtained. After the product has been brought to a finely divided state with anhydrous calcium chloride, a strongly coloured bluish-tinged red pigment is obtained which has very good fastness to light and to migration.

2,5-Di-(4'-chlorophenoxy)-3,6-bis-[2'-methoxy-4'-(4''-chlorophenoxy)-phenylamino]-1,4-benzoquinone was manufactured as follows:

16.8 g of 2,5-dimethoxy-3,6-bis-(4'-chlorophenoxy)-1,4-benzoquinone (manufactured by reaction of 2,3,5,-6-tetra-(4'-chlorophenoxy)-1,4-benzoquinone with sodium methylate in methanol at −10° to −15°C, melting point 172°–174°C) are heated to the boil with 20 g of 2-methoxy-4-(4'-chlorophenoxy)-aniline in a mixture of 150 ml of ethanol and 70 ml of ethylene glycol monoethyl ether and kept at the boil for 20 hours. After cooling to 50°C the product which has precipitated is filtered off, washed with alcohol and dried in vacuo at 110°C. Yield, 24.5 g of red-brown crystals.

EXAMPLES 43 – 54

If instead of the 20 g of 2-methoxy-4-(4'-chlorophenoxy)-aniline equimolar amounts of an amine listed in Table III, column 2 are used and otherwise the same procedure is followed, pigments with similarly good properties are obtained. The shades of 0.2% strength colourations in polyvinyl chloride films are given in column 3 of this table.

Table III

| Example No. | Amine | Shade in PVC sheets, 0.2% of pigment + 1% of $TiO_2$ |
|---|---|---|
| 43 | 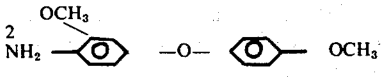 | Blue-red |
| 44 | 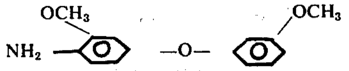 | Blue-red |
| 45 | 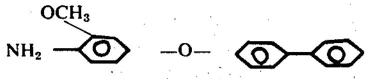 | Blue-red |
| 46 | 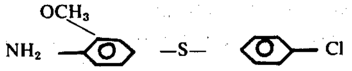 | Blue-red |
| 47 | 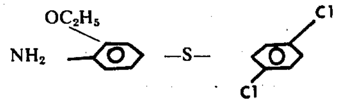 | Blue-red |
| 48 | 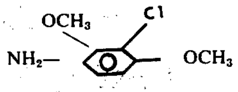 | Blue-red |
| 49 | 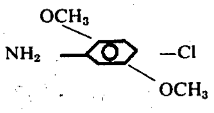 | Blue-red |
| 50 | 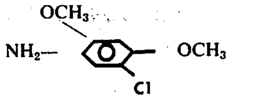 | Blue-red |
| 51 | 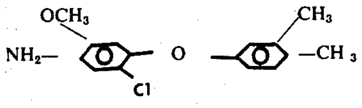 | Blue-red |
| 52 | 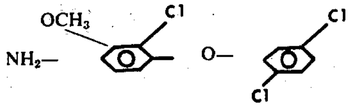 | Blue-red |
| 53 | 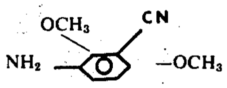 | |

EXAMPLE 54

38.6 g of 2,5-dimethoxy-3,6-bis-[2'4'-bis-(2''-methylphenoxy)-phenylamino]-1,4-benzoquinone and 100 ml of 1,2,4-trichlorobenzene are heated to 200°–205°C and the mixture is stirred at this temperature for 6 hours. After cooling to 40°C, the pigment of the formula

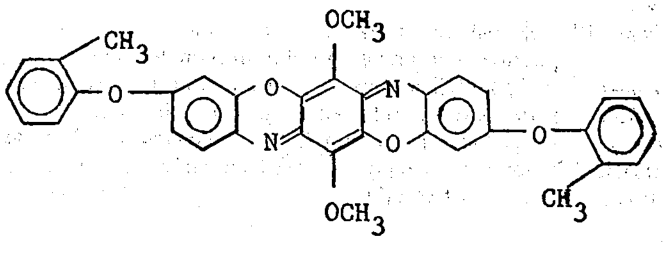

which has precipitated is filtered off, washed with 1,2,4-trichlorobenzene and then with alcohol, and dried in vacuo at 100°C. The yield is 22 g of brown crystals having a green sheen.

The product dyes polyesters in bulk in luminous red colours. The dyeings are stable to heat and fast to light.

2,5-Dimethoxy-3,6-bis-(2'4'-bis-(2''-methylphenoxy)-phenylamino]-1,4-benzoquinone was manufactured as follows:

29.6 g of 2,3,5,6-tetraphenoxy-1,4-benzoquinone are suspended in 150 ml of methanol and cooled to 10°C. At 10°–15°C, a mixture of 20.7 g of a 31% strength sodium methylate solution and 20 ml of methanol is now allowed to run in over the course of 20 minutes. The mixture is stirred for a further hour at room temperature and is then heated to 60°C. After adding 36.7 g of 4-amino-resorcinol di-o-cresyl ether, the mixture is heated under reflux for 6 hours. After cooling to 50°C, the olive-coloured product is filtered off, washed with alcohol, water and alcohol, and dried in vacuo at 100°C. The yield is 20.9 g.

If instead of 38.6 g of 2,5-dimethoxy-3,6-bis-[2'4'-bis-(2''-methylphenoxy)-phenylamino]-1,4-benzoquinone, 40.2 g of 2,5-diethoxy-3,6-bis-[2',4'-bis-(4''-methylphenoxy)-phenylamino]-1,4-benzoquinone are used and otherwise the same procedure is followed, a red pigment with equally good properties is again obtained.

EXAMPLES 55 – 62

If instead of the 36.7 g of 4-amino-resorcinol di-o-cresyl ether equimolar amounts of an amine listed in Table IV, column 2, are used and otherwise the same procedure is followed, pigments with similarly good properties are obtained. Column 3 gives the colour shades of 2 mm thick injection moulded sheets coloured with 0.5% of the pigment.

Table IV

| Example No. | Amine | Shade in PVC sheets, 0.2% of pigment + 1% of $TiO_2$ |
|---|---|---|
| 55 | 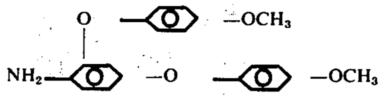 | Blue-red |
| 56 | 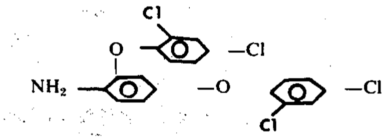 | Red |
| 57 | 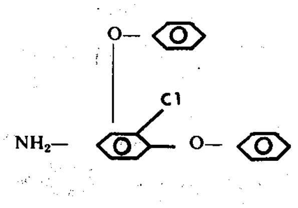 | Red |
| 58 | 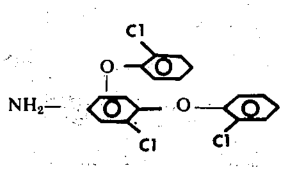 | Red |

Table IV—Continued

| Example No. | Amine | Shade in PVC sheets, 0.2% of pigment + 1% of $TiO_2$ |
|---|---|---|
| 59 | 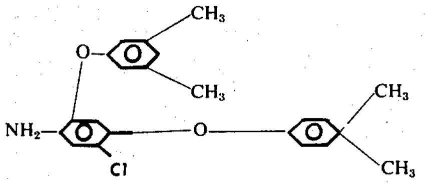 | Red |
| 60 | 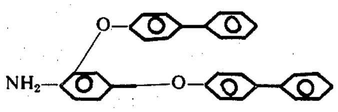 | Red |
| 61 | 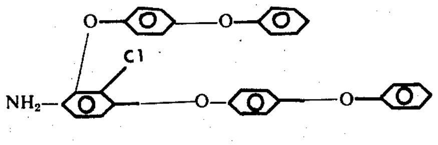 | Red |
| 62 | 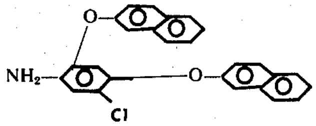 | Blue-red |

EXAMPLE 63

33.78 g of 2,5-di-methylmercapto-3,6-bis-(2',4'-di-phenoxy)-phenylamino-1,4-benzoquinone and 100 ml of 1,2,4-trichlorobenzene are heated to 200°–205°C and stirred for 3 hours at this temperature. After cooling to 50°C, the pigment of the formula

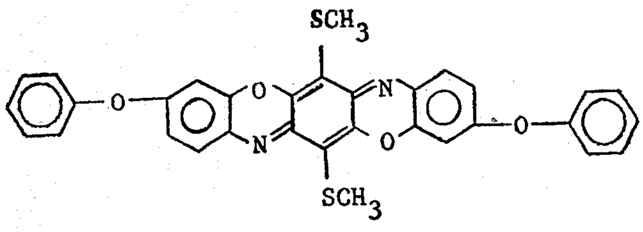

which has precipitated is filtered off, washed with 1,2,4-trichlorobenzene, alcohol and acetone and dried in vacuo at 100°C. The yield is 20 g of violet crystals having a green sheen.

After bringing the product to a finely divided form by grinding with anhydrous calcium chloride, a red pigment is obtained, which dyes polyesters in bulk in a luminous red. The dyeings are stable to heat and fast to light.

2,5-Di-methylmercapto-3,6-bis-(2'4'-di-phenoxy)-phenylamino-1,4-benzoquinone was manufactured as follows:

28.6 g of 2,3,5,6-tetraphenoxy-1,4-benzoquinone are suspended in 80 ml of methanol and cooled to 10°C. A solution of 8.64 g of methylmercaptan, dissolved in a mixture of 80 ml of methanol and 20.9 g of a 31% strength sodium methylate solution, is now added dropwise to this suspension over the course of 20 minutes at 10°–15°C. The mixture is stirred for a further hour at room temperature and is then heated to 60°C. After adding 28 g of 2,4-diphenoxy-aniline the whole is heated under reflux overnight. After cooling to 50°C, the brown-yellow product which has precipitated is filtered off, washed with alcohol, water and alcohol and dried in vacuo. The yield is 20.7 g.

EXAMPLE 64

A pigment which is also red and has equally good properties is obtained, otherwise following the same procedure, if instead of the 33.78 g of 2,5-di-methylmercapto-3,6-bis-[(2'4'-diphenoxy-phenylamino)]-1,4-benzoquinone, 40.5 g of 2,5-di-ethylmercapto-3,6-bis-2',4'-bis-(4''-methoxyphenoxy)-phenylamino-1,4-benzoquinone are employed in the reaction.

EXAMPLE 65

27.2 g of 2,3,5,6-tetra-(4'-chlorophenylthio)-1,4-benzoquinone, 24.1 g of 2,5-diethoxy-4-benzoylamino-aniline, 5.2 g of quinoline and 200 ml of 1,2,4-trichlorobenzene are heated overnight to 120°–125°C. Thereafter the mixture is heated to 200°–205°C and stirred at this temperature for 7 hours. After cooling to 100°C, the pigment of the formula

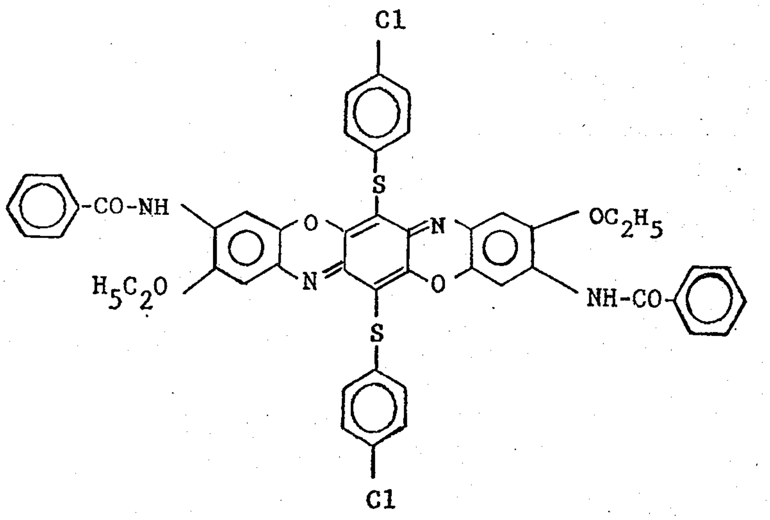

which has precipitated is filtered off, washed with 1,2,4-trichlorobenzene heated to 100°C and then with alcohol, and dried in vacuo at 100°C. The yield is 15.5 g of green crystals having a metallic sheen.

After bringing the product to a finely divided form by grinding with anhydrous calcium chloride, a strongly coloured reddish-tinged blue pigment is obtained, which has very good fastness to light, overlacquering and migration.

EXAMPLE 66

If instead of 27.2 g of 2,3,5,6-tetra-(4'-chlorophenylthio)-1,4-benzoquinone, 23.84 g of 2,3,5-,6-tetra-(4-methylphenylthio)-1,4-benzoquinone are used and otherwise the same procedure is followed, a reddish-tinged blue pigment with equally good properties is again obtained.

EXAMPLE 67

27.14 g of 2,4,5,6-tetra-(4-chlorophenylthio)-1,4-benzoquinone and 19.3 g of 3-amino-N-ethylcarbazole are heated to the boil, for 18 hours, in a mixture of 150 ml of ethanol, 60 ml of ethylene glycol monoethyl ether and 3.5 g of morpholine. After cooling to 60°C, the dianil which has precipitated is filtered off, washed with alcohol and dried in vacuo at 100°C. 28.4 g of brown crystals are obtained.

28.33 g of the dianil, 250 ml of 1,2-dichlorobenzene and 4.6 ml of benzene sulphochloride are heated to 175°–180°C for 5 hours. After cooling to 110°C, the product of the formula given above, which has precipitated, is filtered off, washed with 1,2-dichlorobenzene heated to 110°C and then with alcohol, and dried in vacuo at 120°C. Yield: 10 g of green crystals having a metallic sheen. The dyestuff corresponds to the formula

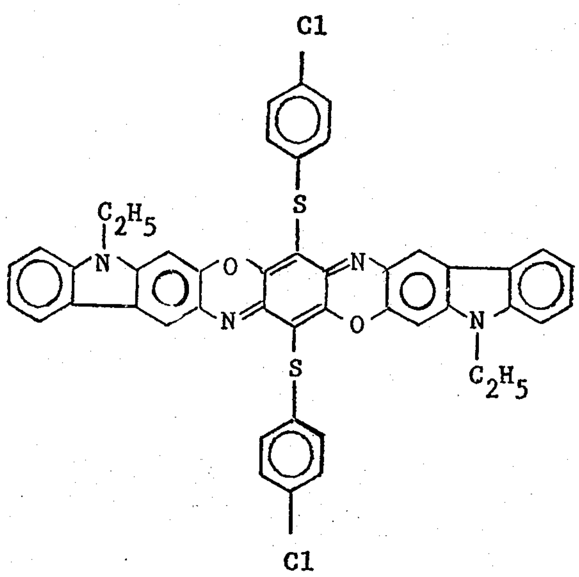

After bringing the product to a finely divided form by grinding with anhydrous calcium chloride, a strongly coloured reddish-tinged blue is obtained, which has very good fastness to light, weathering, overlacquering and migration.

EXAMPLE 68

0.6 g of the pigment which has been manufactured according to Example 1 and ground with calcium chloride is mixed with 67 g of polyvinyl chloride, 33 g of dioctyl phthalate, 2 g of dibutyl tin dilaurate and 2 g of titanium dioxide and the mixture is milled for 10 minutes at 140°C. Pure reddish-tinged blue polyvinyl chloride sheets of very good fastness to migration and to light are obtained.

EXAMPLE 69

10 g of titanium dioxide, 35 g of a 60% strength solution of a modified urea-alkyd resin in 1:1, xylene/-butanol, 10 g of turpentine oil and 5 g of xylene are ground with 2 g of the pigment manufactured according to Example 8 for 48 hours in a ball mill. If this coloured lacquer is cast onto aluminium foils and stoved for 1 hour at 120°C, lacquerings which are distinguished by a pure very reddish-tinged violet colour shade, and very good fastness to light, weathering and overlacquering, are obtained.

EXAMPLE 70

1,000 g of polypropylene (grand Moplen 550G of Messrs. Montecatini, Milan) and 1 g of a pigment manufactured, and ground, according to Example 13 are thoroughly mixed in a mixing drum on a set of rollers, at a roller speed of 70 revolutions per minute, for 10 minutes. The dry-coloured granules are now processed on a screw injection moulding machine at 250°C. Pure reddish-tinged blue sheets are thus obtained. The colourations are fast to heat and to light.

EXAMPLE 71

1,000 parts of polyethylene terephthalate granules and 1 part of triethylphosphite are thoroughly mixed in a mixing drum. After adding 2.5 parts of dyestuffs of the formula

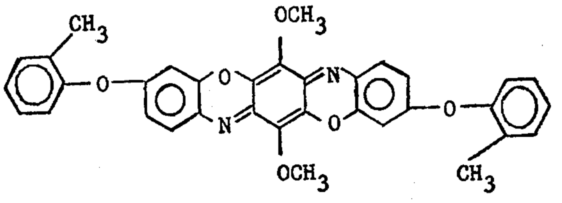

the whole is mixed for a further 15 minutes and thereafter dried fro 10–12 hours in vacuo at 120°C. The granules treated in this way are spun at 250°–275°C by the melt spinning process. Pure strongly coloured bluish-tinged red fibres are obtained, which have very good fastness to light, weathering and migration.

EXAMPLE 72

To manufacture an ink for graphic purposes, 2 g of the pigment which has been manufactured according to Example 5, Table 1 and ground with salt are mixed and ground, on a triple roll mill, with 36 g of hydrated alumina, 60 g of linseed oil varnish of medium viscosity and 0.2 g of cobalt linoleate.

Pure red-blue prints of high colour strength and good fastness to light are obtained with this colour paste.

We claim:

1. A dioxazine dyestuff of the formula

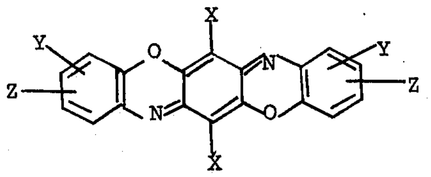

wherein

Y and Z denote hydrogen; halogen; nitro; nitrile; carbamoyl; lower alkyl; lower alkoxy; lower alkylmercapto; lower alkylsulphonyl; lower alkanoyl; lower alkanoylamino; lower alkoxycarbanoyl; lower alkylcarbamoyl; lower alkylsulphamoyl; phenoxy; phenoxy substituted by one or two radicals selected from the group consisting of halogen, lower alkyl, lower alkoxy, lower alkanoyl, phenyl, or phenoxy; phenyl; benzoyl; benzoylamino; benzoylamino substituted by one or two radicals selected from the group consisting of halogen, lower alkyl, lower alkoxy, or lower alkoxycarbanoyl; phenylcarbamoyl; phenylsulphamoyl; phenylamino; phenylamino substituted by halogen, trifluoromethyl, lower alkyl, lower alkoxy, or lower alkoxycarbonyl; or wherein the radicals Y and Z form an indole ring with the group to which they are attached of the formula

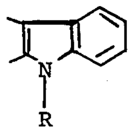

wherein

R is hydrogen; or lower alkyl;

X is lower alkoxy; lower alkylmercapto; or a radical of the formula

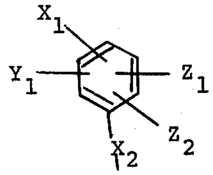

wherein $X_1$ denotes H; halogen; lower alkyl; lower alkoxy; lower alkanoyl; lower alkoxycarbonyl; trifluoromethyl; carboxylic acid amide; carboxylic acid amide substituted by one or two radicals selected from the group consisting of lower alkyl, or phenyl; phenoxy; benzoyl; or benzoyl substituted by one or two radicals selected from the group consisting of halogen, lower alkyl, or lower alkoxy;

$Y_1$ and $Z_1$ denote H; halogen; lower alkyl; or lower alkoxy;

$Z_2$ denotes H; or halogen; and $X_2$ denotes oxygen; or sulphur.

2. A dioxazine dyestuff according to claim 1, wherein $X_2$ denotes a O atom.

3. The compound according to claim 1 of the formula

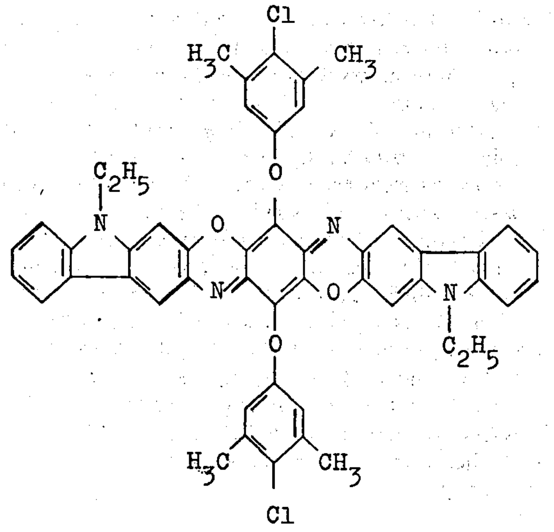
4. The compound according to claim 1 of the formula
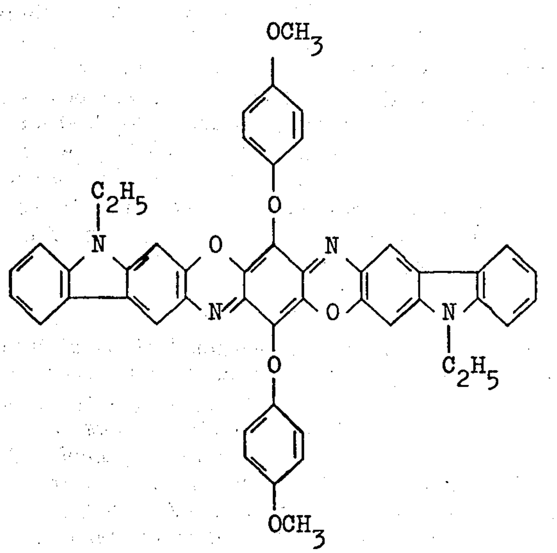
* * * * *